United States Patent [19]

Koslowski

[11] Patent Number: 4,670,055

[45] Date of Patent: Jun. 2, 1987

[54] METHOD FOR QUICK SETTING OF A POURABLE RAW MIXTURE

[75] Inventor: Thomas Koslowski, Aachen, Fed. Rep. of Germany

[73] Assignee: Sicowa Verfahrenstechnik, Fed. Rep. of Germany

[21] Appl. No.: 697,832

[22] Filed: Feb. 4, 1985

[30] Foreign Application Priority Data

Feb. 4, 1984 [DE] Fed. Rep. of Germany ....... 3403866

[51] Int. Cl.$^4$ ............................................. C04B 7/32
[52] U.S. Cl. .................................... 106/104; 106/315
[58] Field of Search ................................ 106/104, 315

[56] References Cited

U.S. PATENT DOCUMENTS

| 4,082,561 | 4/1978 | Nakagawa et al. | 106/104 |
| 4,341,561 | 7/1982 | Britt et al. | 106/104 |
| 4,352,693 | 10/1982 | Langdon | 106/104 |
| 4,357,167 | 11/1982 | Kellet et al. | 106/104 |

FOREIGN PATENT DOCUMENTS

2364252  6/1975  Fed. Rep. of Germany ...... 106/104

*Primary Examiner*—William R. Dixon, Jr.
*Assistant Examiner*—Steven Capella

[57] ABSTRACT

The invention is concerned with a method for controlling the quick setting of a pourable raw mixture having a filler material, water, a cement that contains at least in part an aluminate capable of reacting with calcium hydroxide, in particular aluminum oxide cement, with an organic substance, in particular, hydro-oxycarboxylic acid, serving as a set-up retarder for the aluminate, complex forming, and stunting the growth of calcium aluminum sulfate hydroxide, and further of calcium hydroxide and in some instances, foam. In order to come up with the minimum possible number of cement components for the hardening of the raw mixture, and in order to achieve good control of the charging time and set-up process with the possibility of achieving adequate hardness in a matter of minutes, the aluminate is premixed with the organic set-up retarder and the calcium sulfate in a calcium hydroxide-free environment sometimes together with additional stabilizing components of the raw mixture. In this manner, the aluminate particles are coated by a coating of gelatinous ettringit stabilized by the organic set-up retarder to prevent reactions with the calcium hydroxide. The finished raw mixture contains at least essentially as much calcium hydroxide as is necessary for transforming the reactive aluminate. The solidification of the raw mixture is produced by the formation of a monophase whereby the initiation of solidification and the hydration characteristics are controlled by choosing the ratio of the retarder additives and the mixing temperature. The invention is also concerned with application of this method to the manufacture of building materials.

30 Claims, 3 Drawing Figures

METHOD FOR QUICK SETTING OF A POURABLE RAW MIXTURE

BACKGROUND OF THE INVENTION

The invention comprises a method for controlling quick setting of a pourable raw mixture having a filler material, water, calcium hydroxide, in some cases foam, and additionally cement, which consists at least partially of an aluminate capable of reacting with calcium hydroxide, in particular, an alumina cement, with an organic substance serving as a setting retarder for the aluminate, forming a complex and inhibiting the growth of calcium aluminum sulfate hydrate, in particular, hydroxycarboxylic acid.

A method for manufacturing concrete components is known from U.S. Pat. No. 4,102,962 in which a hydraulic cement is used which contains alumina cement (10–35% based on total cement), quick lime and/or calcium hydroxide (5–30% based upon the alumina cement), as well as a retarder in the form of an hydroxy- or ketocarboxylic acid or a salt thereof. Since a raw mixture made from this hydraulic cement immediately begins to set, large charges of the raw mixture to be continuously drawn upon cannot be produced, and instead the total charge must be poured immediately into a mold since no open holding times or pot-life are available. With this method, very limited quantities of lime are employed in order to avoid a very strong reaction already during the mixing of the raw mixture. Blank strength is achieved only after 20 minutes, and the demolded concrete must be allowed to stand for at least two hours to five days at a temperature less than 40° C. in a humid atmosphere, after which autoclaving is undertaken.

A method of manufacturing cinder blocks for building materials made of a calcium silicate base is known from the U.S. Pat. No. 4,376,086. In this process, a pourable raw mixture is manufactured essentially out of a granular silicate-containing material such as quartz sand, lime, water, cement, and foam, whereby Portland cement together with a setting accelerator, and in some instances, a retarder and a correspondingly adjusted jet cement, respectively are used. This cement is used in order to achieve a satisfactory pot time for the raw mixture before it is poured into the mold during which practically no setting reactions take place. The latter reactions are caused initially in the mold substantially through the action of heat so that the formed blank exhibits a satisfactory strength for removal from a mold and transporting. The blank can then be hardened in an autoclave. This method requires, however, relatively large quantities of cement in order to acquire the necessary strength of the raw mixture, whereby it is difficult to control pot time and setting in a desired manner.

A jet cement is known from British Pat. No. 2,033,367. This cement contains Portland cement, calcium aluminate, calcium sulfate, an inorganic salt, a hydroxycarboxylic acid or a salt thereof, for instance sodium citrate, and when mixed with water posesses a pot time of approximately 20 minutes. However, if this type of quick setting cement is employed in a calcium hydroxide-rich environment, it sets in an uncontrolled manner and at an exceptionally fast rate since the calcium hydroxide reacts immediately with the calcium aluminate, as is also described in U.S. Pat. No. 4,102,962. The solidification regulators used would not prevent the fast setting. An appropriate solidification control would also not be possible with greater amounts of retarder additives, since these to be sure would halt the solification somewhat but would disturb rather severely subsequent hardness development. For the control of solidification and hardening of calcium hydroxide-rich systems, this quick setting cement is not suitable.

A cement is known from German Pat. No. 2,547,765 which contains an aluminua cement, calcium sulfate, an organic setting retarder, as well as a component releasing calcium hydroxide (hydrated) and some Portland cement. This cement is converted into ettringite on hydration and produces a quick setting cement. If this type of cement is employed in the presence of large quantities of free calcium hydroxide, an immediate setting takes place, so that the possibility of continuous control over the pot time and also the release therefrom by means of elevated temperatures are not possible. This system is controllable if there is no free calcium hydroxide available since the Portland cement does not possess any nominal value of freely available, calcium hydroxide. Portland cement contains at a maximum approximately 2% CaO which is strongly sintered due to high temperatures and is only slightly reactive. Additionally, the lime in mineral phases (for example, C3S or C2S) is firmly bonded and is set free as calcium hydroxide only in a period of hours.

It is known from French Pat. No. 2,233,295 on the one hand to manufacture a cement, mortar or concrete mixture, and on the other hand an effective material for fast solidification in the form of a powder or a suspension of calcium aluminate and an inorganic sulfate whereby the raw mixture yielded from the mixture of these products is immediately ready for working. The effective material can contain a hydroxycarboxylic acid retarder as well as an accelerator which can consist of at least some minimal quantities of calcium hydroxide. Apart from the minimal quantity of calcium hydroxide, nothing else would work in a calcium hydroxide-rich environment. The effective material should, if possible, not set for at least a half-hour; however, mixing with cement, mortar, or concrete should lead very swiftly to set. One should strive for a stiffening in a few minutes, for example, one to three minutes. By this means, however, the early strength on which the ettringit formation is based, is achieved slowly in the range of hours. In comparison, no controlled or long pot times, and activation through the application of heat on the total mixture can be strived for or obtained with early strength reached very rapidly.

DETAILED DESCRIPTION OF THE INVENTION

Figure 1:
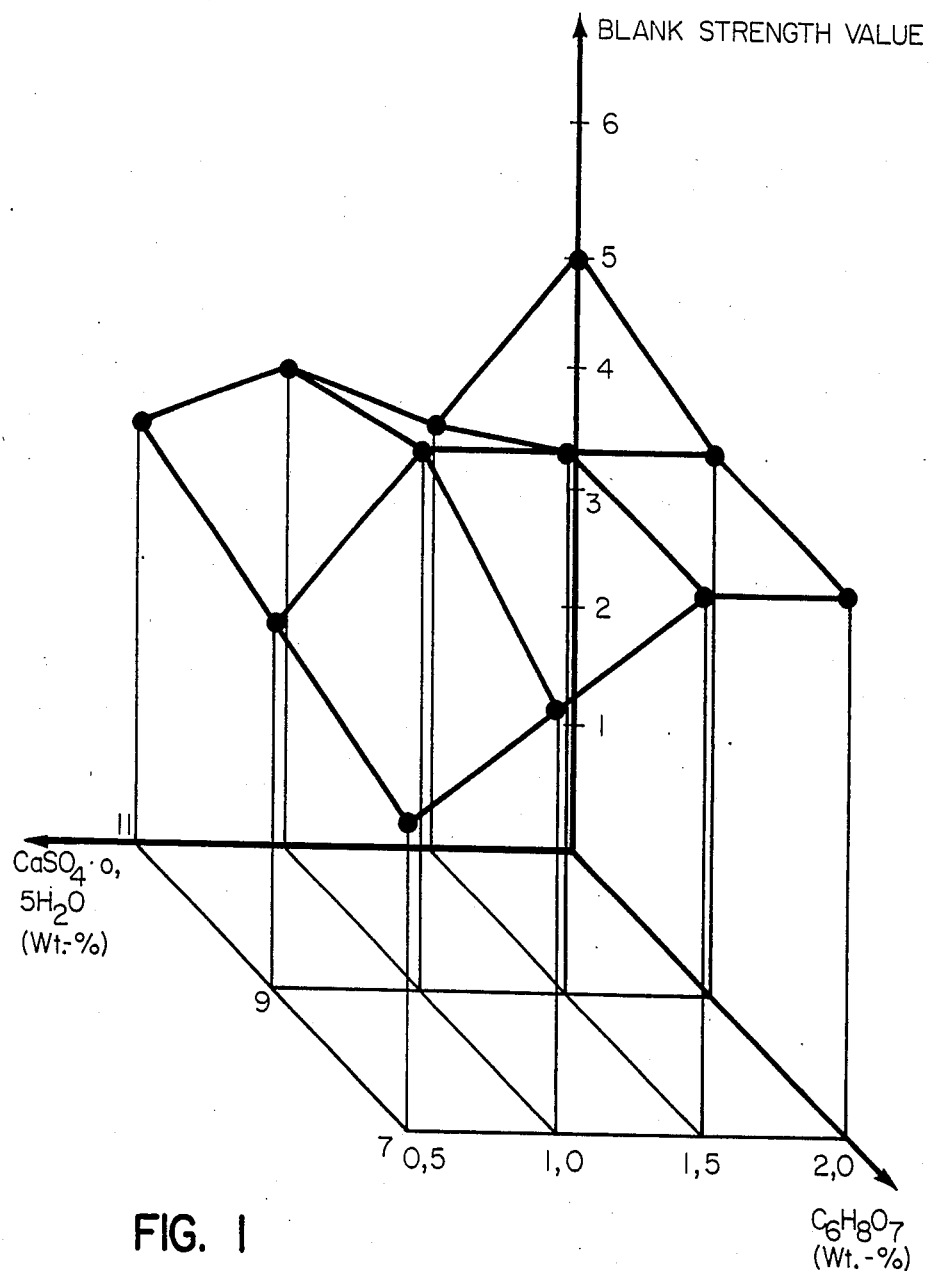

An object of the invention is to provide a method of the foregoing type that makes it possible to come up with the minimum amount of cement content for hardening of the raw mixture and which allows a good control of the holding or pot time in the setting process with a possibility of achieving satisfactory strength within minutes.

This object is achieved by mixing aluminate with an organic setting retarder and the calcium sulfate Cs in a calcium hydroxide-free aqueous environment, in some cases together with further stabilizing components of the raw mixture, so that the aluminate particles are coated and protected against reactions with the calcium hydroxide by a gel-type ettringite coating that is stabilized by the organic setting retarder, and by using essentially at least as much calcium hydroxide for the final raw mixture as is necessary for conversion of the reactive aluminate, so that the solidification of the raw mixture is produced by the formation of monophases, whereby the initiation of setting and the hydration characteristics are controlled through the selection of ratios of retarder additives and mixture temperature.

For setting, the following formal reactions are used:

$$C_{12}A_7 + 16CH + 75H \rightarrow 7C_4AH_{13} \qquad (1)$$

and $$CA + 3CH + 10H \rightarrow C_4AH_{13}. \qquad (2)$$

These reactions run out in a matter of seconds and minutes and lead extremely rapidly to low sulfate monophase of the mixed crystal series $$C_3(A,F)(Cs.CH).H_{12}. \qquad (3)$$

In these reactions a large amount of calcium hydroxide is required due to the necessity of completely converting the aluminate. Thus, for example, for a complete reaction to $C_4AH_{13}$ when employing normal commercial alumina cement (approximately 50% $Al_2O_3$) with a principal stabilizing component CA (maximum approximately 80%), 112 parts of weight of calcium hydroxide must be added to 100 parts of weight of alumina cement on a purely theoretical calculation.

Control over the pot time and the setting process must certainly be guaranteed in a raw mixture which already has in the mixture a high potential for freely available calcium hydroxide (in the form of $Ca(OH)_2$ and/or CaO) in relation to the reactive aluminate. Thus, it is to be expected that the reactive aluminate, i.e. $C_{12}A_7CA$ or CA in alumina cement would be effectively coated. Reactive aluminate normally would react in seconds or minutes with the calcium hydroxide in accordance with the reactions given above. According to the invention, to retain the raw mixture workable for a long time period, preferably more than half an hour, in spite of the high calcium hydroxide amount in the presence of reactive aluminate, said aluminate is to be protected against the reaction with calcium hydroxide.

Depending on the temperature level of the raw mixture a particular pot time can be adjusted through an appropriate recipe. With stable recipes the length of the holding or pot time is influenced by the temperature of the raw mixture. Furthermore, this means that the above-mentioned reactions can be achieved essentially immediately by heating the raw mixture to an elevated temperature which may be relatively low, somewhat greater than 45° C., but clearly above the ambient temperature. In this manner, satisfactory preliminary hardening can be achieved in a matter of minutes, preferably in less than two minutes.

For the aluminate, an alumina cement is particularly used; however, it is also possible to employ aluminum sulfate, a normal commercial monocalcium aluminate or similar cement. This component is employed together with two retarders one of which is a complex forming organic compound that inhibits the growth of the calcium aluminate sulfate hydrates comprising ettringite and hemihydrate. The organic substance might be in particular a hydroxycarboxylic acid, preferably citric, tartaric, or malic acid. The other retarder is a sulfate carrier in the form of a calcium sulfate, in particular calcium sulfate hemihydrate, preferably plaster of Paris or normal calcined gypsum or calcium sulfate anhydrite, such as natural anhydrite or calcium sulfate dihydrate.

If the blanks formed form the raw mixture must be autoclaved, it is useful to employ a combination of calcium sulfate hemihydrate and calcium sulfate anhydrite. If only the hemihydrate were added a very rapid early hardening could be achieved facilitating the removal of the blanks, and demolding, transporting and stacking would be possible in a very short time due to the monophase configuration. However, the monophase structure formed would be like a house of cards and not stable in the autoclave for structural reasons, that is, mechanical loading in the heat-up phase of the hardening cycle would lead to the disintegration of the blank.

In combining the sulfates as hemihydrate ($CaSO_4.0.5H_2O$) and finely ground anhydrite, such as natural anhydrite ($CaSO_4$), produced the blank is made autoclaveable. The natural anhydrite plays only a minor role in controlling the fast setting due to its sluggish reactivity. While the hemihydrate is used up in the formation of the primary ettringite and the monophases, the natural anhydrite remains for the most part preserved until after the alumina cement is hydrated, and can then react with the comparatively Al-rich and $SO_4$-poor monophases and the residual unreacted aluminate to form $SO_4$- richened secondary ettringite which causes a very favorable intertwining and intergrowth of the remaining monophases and the other residual components due to its long acicular, fibrous habit according to the following reaction $$C_3ACs.H_{12} + 2Cs + 2OH \rightarrow C_3A3Cs.H_{32}. \qquad (4)$$

so that the blank is hard enough to be autoclaved. This reaction continues into the late phase of hardening approximately a half to two hours after solidification. In calculating the amount of anhydrite for the formation of a secondary ettringite, the sulfate from the other components of the raw mixture, for example, the sulfate of Portland cement, must be considered. The secondary ettringite formation is related to further increase in hardness. Moreover, the shrinkage of the cooling blank is thus compensated for.

In the event that autoclaving is not desired, the natural anhydrite additive can be eliminated.

Not only citric acid (or the other organic compounds employed) but also hemihydrate and anhydrite must be considered as setting retarders for the aluminate or alumina cement (in some cases, the sulfate can also accelerate the reaction of the pure alumina cement), but the setting retarders do not work alone in calcium hydroxide-rich systems, since they do not sufficiently protect the aluminate or the alumina cement against the calcium hydroxide and therefore cannot give rise to setting retardation. Suprisingly, however, it has become evident that through the combination of both setting retarders and the separate production of a mixture of them with water, aluminate and in particular, alumina cement can also be retarded as required in a calcium hydroxide-rich environment. By a calcium hydroxide-rich environment, it is meant that in such environments more calcium hydroxide (when such is added or is formed through slaking of quick lime in the raw mixture) is available than is stoichiometrically necessary for complete reaction with the aluminate or cement (in other words, besides the supplied calcium hydroxide, the hydroxide is present as well in suspension as a larger calcium hydroxide source). At the same time, a practically immediate deactivation of the retarder system is produced at relatively low temperatures through heating to a relatively low temperature which is, however, clearly above ambient temperature.

The sulfate carrier alone leads to ettringite formation on the surface of the aluminate or alumina cement particles during premixing. This formation, however, in a calcium hydroxide-rich environment would not suffice as a perpetual protective layer and accordingly could not stop the hardening of the raw mixture. This ettringite would coat the anhydrated particles with a thin layer of smaller, columnar crystals. However, if one combines the sulfate and organic retarder in a premix, then this layer of primary ettringite is essentially amorphous and gelatinous. The growth of this layer is stopped by the citric acid which precipitates almost monomolecularly on the surface of the primary ettringite as an amorphous tri-calcium dicitrate ($C_{12}H_{10}Ca_3O_{14}.4H_2O$). This protective layer of primary ettringite and the tri-calcium dicitrate (or corresponding salt of another organic retarder) seals the alumina cement surface very well, whereby the citrate additionally suppresses the heterogeneous nucleus formation of potential hydrate phases. Simultaneously, the amount of as yet un-reacted sulfate and citric acid present (as sediment and in solution) is large enough to counteract the porosity of the protective layer and thwart the setting reactions).

The aluminate treated in this manner in the premixing is effectively retarded and guarantees a sufficiently long pot time in the calcium hydroxide-rich raw mixture. This permits a pot time on the order of twenty minutes to one hour or more to be adjusted according to the temperature of the raw mixture and the dosages of the retarder combinations.

Figure 3:
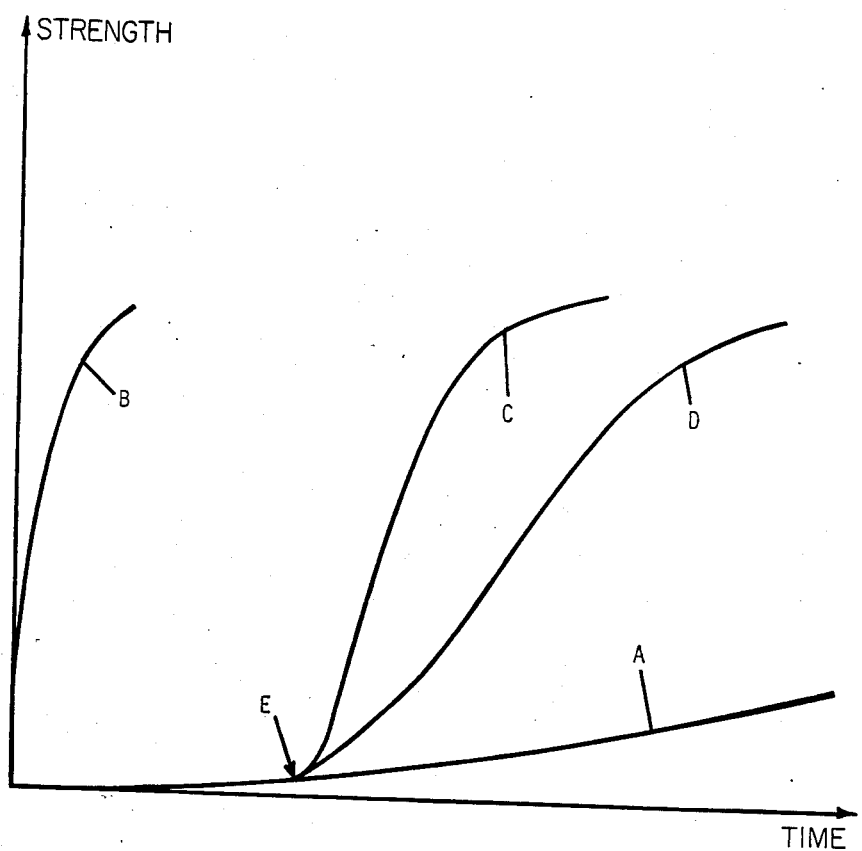

Additions of the organic retarder (citric acid) and calcium sulfate as hemihydrate (however also as calcium sulfate the dihydrate and less effectively as anhydrite) serve as control parameters for the pot time and hydration characteristics. A proportional increase of both additives increases the pot time. If the retardation is primarily due to the citric acid dosage, a steep hardening characteristic results (curve C in the diagram of FIG. 3 in which the strength is plotted against time, curve A is the characteristic of the raw mixture without the retarder combinations, and curve B is the characteristic of the raw mixture with the retarder combinations, however, without deactivation thereof by heating). If the retarder is dominated by the calcium sulfate, hemihydrate dosage, a greatly depressed characteristic results (curve D).

Through increase of the temperature to somewhat over 45° C., the retarder is suddenly deactivated (point E of Curve C). The amorphous tri-calcium citrate is converted into long prismatic crystals of tri-calcium dicitrate. A suppression of the heterogeneous nucleus formation, or correspondingly, an inhibition of the crystalline growth of the hydration products is no longer caused. The primary ettringite layer breaks up and the aluminate can react rapidly and completely with the calcium hydroxide of the raw mixture. In this manner, large volumes of sheetlike monophases of mixed crystalline series are formed which can incorporate considerable amounts of sulfate in the crystal latice (depending upon the calcium sulfate dosage). Within a short time of one to three minutes, a setting of the raw mixture results which permits the demolding, transporting and stacking of the blank. In mixtures to be autoclaved, this is followed by formation of secondary ettringite within a period of approximately a half to two hours. The continuous reaction series can be formally illustrated as follows:

A. Retarder Reaction:

$$12CaO.7Al_2O_3 + 9CaSO_4.0.5H_2O + 2C_6H_8O_7 + nH_2O \rightarrow Ca_3(C_6H_5O_7).4H_2O + 3(3CaO.Al_2O_3.3CaSO_4.32H_2O) + 8Al(OH)_3 + mH_2O \qquad (5)$$

B. Strength Forming Reactions (in the range of minutes):

$$C_{12}A_7 + 16CH + 75H \rightarrow 7C_4AH_{13} \qquad (6)$$

$$CA + 3CH + 10H \rightarrow C_4AH_{13} \qquad (7)$$

C. Crystallization into Secondary ettringite:

$$C_4AH_{13} + 3Cs + 2OH \rightarrow C_3A3Cs.H_{32} + CH \qquad (8)$$

Bearing in mind the inclusion of sulfate in the monophases, the reaction previously presented (Reaction 4) is brought into play. The reaction chain is thus:

Primary Ettringite—Monophases—Secondary Ettringite

In comparison thereto, the reactions with Portland cement run along the reaction chain ettringite—monosulfate (containing sulfate)—monosulfate (sulfate-free). With very high sulfate dosages as in German Pat. No. 2,547,765, ettringite is formed as the essential reaction product of the early hardening phase, while with the French Pat. No. 2,233,295 and the British Pat. No. 2,033,367, a mixed crystallization of AFM- and AFT-phases can be observed.

The reaction resulting in the formation of secondary ettringite from monophases and residual aluminate, respectively, and sulfate is already known, for example, in mortars and concretes, as a deleterious reaction (sulfate-driven). However, this refers to the moment of the reaction in cement (Portland cement) in particular, mortar or concrete, after the silicate part of the cement has reacted and the final hardness has been achieved, that is, after days, weeks, or months, and not in the range of hours as that produced in accordance with the method of the present invention described above for reaching an autoclaving hardness.

In particular, if 77% by weight of the alumina cement is employed together with premixed 14.6% by weight natural anhydrite, 6.2% by weight plaster of Paris (calcium sulfate hemihydrate) and 2.3% by weight citric acid monohydrate, while generally 1 to 3% by weight organic retarders, 9 to 25% by weight sulfate carriers, and the balance alumina cement are premixed in a calcium hydroxide-free environment with a corresponding proportion of water (the water/cement mixture ratio being between 1 and 3) good results are achieved.

Predominantly with products which are not anticipated to be placed in an autoclave, the percentages by weight employed are 89% by weight alumina cement with 2% by weight citric acid and 9% by weight plaster of Paris, whereas in general, 0.5 to 4% by weight organic setting retarders, 5 to 12% by weight sulfate carriers, and the balance alumina cement when mixed in a calcium hydroxide-free environment with a corresponding portion of water have proven to be most favorable.

In some instances, the alumina cement can be premixed with the two retarders together with additional stabilizing components of the raw mixture which are relatively inert with respect to the retarders, for example, with filler materials such as sand, silica powder, fly-ash, mineral fibers or the like, or other cement such as Portland cement or the like. For this the free lime (CaO of approximately a maximum of 2%) introduced into the system through the Portland cement and the calcium hydroxide set free in the course of the hydration of the Portland cement is of consequence to the course of the described retarder relations for the reasons stated above. It must also be kept in mind that possibly the sulfate introduced through this cement can in some instances influence the dosage of the sulfate carrier.

To accelerate the reaction of the alumina cement with the application of heat, a limited part of the hemihydrate can be replaced with potassium sulfate.

The method is especially suitable, if the raw mixture is supplemented by foam or correspondingly a foam is produced in the mixture by means of a foam producer, since it is compatible with the foam and its chemical components as long as the release temperature does not lead to the degradation thereof.

A rapid heating of the raw mixture to the release temperature is permitted, for example, by high frequency heating of the raw mixture, or by introducing the heat as the heat of hydration of the correspondingly inhibited quick lime.

The method can be employed for the manufacture of construction materials such as blocks based upon a calcium silicate. In this process, a raw mixture is formed from a granular silicate containing material such as silica sand or powder, lime, water, and in some instances, foam. The mixture than is supplemented by the alumina cement premixed with the two retarders. The foam additive can also be produced after the addition of the premixture composed of the alumina cement and retarders.

The formation of secondary ettringite is influenced by the degree of fineness and the reactivity of the anhydrite, so that natural anhydrite is generally less reactive than the artificially manufactured type. Less reactivity and coarser grains extend the reaction time for the formation of the secondary ettringite.

EXAMPLE 1

For the manufacture of calcium silicate blocks of low bulk density, 334 kg of quartz powder and 135 kg of calcium hydroxide were dry-mixed and then combined with 331 kg of water into a first pre-mixture. Simultaneously, 35 kg of alumina cement plus citric acid plus plaster of Paris and additionally 5 kg of natural anhydrite, the last for guaranteeing hardening in the autoclave, were premixed for two minutes with the addition of 30 kg of water to form a second mixture, and then the two mixtures were mixed. Finally, 25 kg of foam having a bulk density of 60 kg/m$^3$ were added after which the resulting raw mixture was poured into an extruder device and therein was heated by means of high frequency heating to approximately 45° C. Within two minutes of leaving the extruder the raw mixture is firm and within another minute transportable. The blanks separated from the mold are stacked and then transported to an autoclave where they are steam-hardened after approximately two hours. This results in a bulk stone density of approximately 500 kg/m$^3$ and a strength greater than 2.5 N/mm$^2$.

Figure 2:
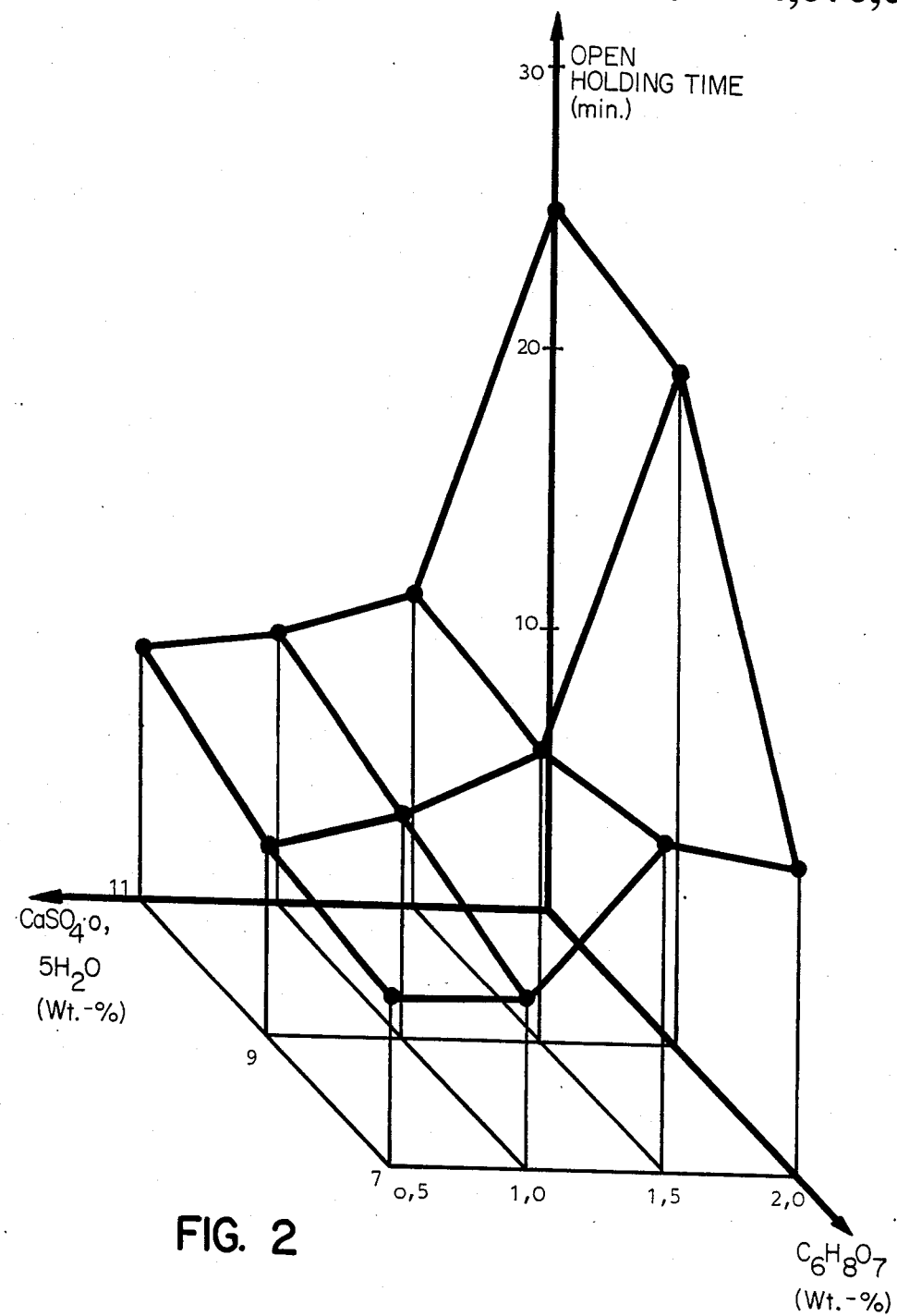

Depending on the premixtures of alumina cement, citric acid and plaster of PARIS, there result various blank strengths and extended charging times as indicated in FIGS. 1 and 2. The quantities of plaster of Paris and citric acid added are plotted three dimensionally against the strength and correspondingly the extended charging time. Here the raw mixture had a temperature of 28° C. before heating in the extruder device. Lowering this temperature through the use of cold water (for instance in the cooler seasons or through cooled water in summer), the extended charge time in particular is shifted to considerably higher values in comparison to the given values. It is however apparent that one can achieve extended pot times of approximately a half-hour even under the most unfavorable conditions in summer. The blank strength is illustrated by arbitrarily selected values where the numeral 6 is the highest value in comparison to $\phi$ which represents no hardness at all.

The alumina cement component contributes practically nothing to the final strength of the autoclaved stone, but is concerned with the blank strength and the transportability of the blank for autoclaving.

With the manufacture of constructing materials, based for example on calcium silicate, other cements can also be added, such as Portland cement (for supplying additional aluminate), and/or blast furnace cement (which provides additional strength after autoclaving through the presence of reactive silica whereby it also serves as a reaction partner for the lime introduced through the cement). These cements serve then to increase the final strength and make possible the reduction of the alumina cement component since through these the aluminate is supplied to the raw mixture. The sulfate thus introduced is taken into consideration during the calculation of the amount of the sulfate retarder to be employed.

The method can also be advantageously employed for the manufacture of ceramic- and refractory products which can particularly be porous wherein, however, calcium hydroxide is to be added. This emanates from a clay slurry which can if necessary, contain as an additive a plasticity diminishing substance, silica powder, chamotte, tabular alumina and the like as grog, whereby one can add to this on the one hand calcium hydroxide and on the other hand alumina cement with the setting retarders of the type such that the alumina cement does not come in contact with the calcium hydroxide before the formation of the protective coating. The ratio of the reactive aluminate and the retarder in comparison to the calcium hydroxide preferably lies at least approximately in the range of 2 to 1, whereby in particular for refractory products, the absolute calcium hydroxide content is attempted to be minimized. The ceramic products also permit addition of calcium carbonate as an activator for the alumina cement. The cement components also cause a corresponding blank strength here; however, additionally we have the advantage that in all cases only a slight drying of the blank must be undertaken due to the formation of extremely water-rich hydrates, such as $C_4AH_{13}$, $C_2AH_8$, and in some cases, $C_3ACsH_{12}$, $C_3ACs_3H_{32}$, that under certain circumstances can be totally disregarded. These water-rich hydrates loose the water at elevated temperatures during firing, yet this takes place so gradually that no cracks or other damage is caused to the product. Through the rapid achievement of a satisfactory hardness of the blank, the stabilizing time of the blank, until now definitely very long due to a time consuming drying procedure, is extremely foreshortened and additionally one can, in some applications, where until now expensive water absorbing gypsum molds had to be employed, disregard these and use plastic molds. In spite of the addition of sulfate and calcium hydroxide, none of the fired materials develops phases detrimental to the quality of the fired product.

For the manufacture of ceramic parts, one can also partially avoid the addition of calcium sulfate serving as a retarder, since the environment is not permeated by calcium hydroxide as much as with the manufacture of calcium silicate products. Instead a potassium salt is applied as a supplemental accelerator to the calcium hydroxide for the alumina cement. This has the consequence that the hardener for the blank is completely incorporated in the ceramic bond.

The total calcium hydroxide content of the raw mixture can be minimized in some instances through the use of $Al_2O_3$-rich alumina cement (high alumina cement).

Finally, within the method according to the present invention, generally CaO can be advantageously added to the raw mixture as a last step and leads, due to its exothermal slaking reaction, to an increase in the temperature of the raw mixture, which often is already sufficient to cause the strength forming reactions through the alumina cement or needs only a slight additional heating. With constant calcium hydroxide content in the raw mixture, the insertion of CaO is necessary to adapt the retarder contant to the smaller specific surface of CaO as compared to calcium hydroxide.

EXAMPLE 2

With 367 kg of clay including plasticity diminishing substances and 429 kg of water, a slurry is formed. Then, a premixture of 30 kg water and 29 kg alumina cement plus citric acid plus plaster of Paris (or normal calcined gypsum) is produced and mixed with the slurry. After this, 29 kg of calcium hydroxide are added followed by 22 kg of foam of a bulk density of 60 kg/m³. The raw mixture produced in this manner is then filled into a mold heated to approximately 50° C. with a high frequency heater, and after 5 minutes stripped from the mold, whereby the heating lasted for 70 seconds. The blank has a sufficient stability and is finally fired. A kiln temperature of 1200° C. yields a bulk density of 527 kg/m³ with a total shrinkage of 19% and a shrinkage during firing of 12%. A firing temperature of 1300° C. yields a bulk density of 689 kg/m³ with a total shrinkage of 28% and a shrinkage during firing of 21%. In both cases, the final strength is greater than 2.5 N/mm³.

With regard to the blank strength and the extended pot time, curves result which are very similar to those illustrated in FIGS. 1 and 2.

The method can also be employed in conjunction with plastifiers, for the manufacture of construction blends or mortar, plaster and floor pavement. Besides plastifiers, an acrylic dispersion or the like, a filler-like fibers, sand, as well as additives such as methylcellulose and/or color pigments may be used. Then the alumina cement+the hydroxycarboxylic acid+the sulfate carrier as well as the lime in the form of calcium hydroxide or also as CaO, are employed for supplemental delivery of chemical heat. Here a calcium compound, in particular calcium carbonate, can be employed, additionally or in place of a sulfate carrier, since here the environment for the alumina cement is less lime-rich than in the case of the manufacture of calcium silicate products. The application in combination with the organic binders leads to a combination of elasticity caused by the organic binders with the strength caused by the cement (which can be increased through the addition of Portland cement, and/or blast furnace cement) in combination with a rapid hardening as well as material improvement. In the case of additions of Portland cement, the application of hemihydrate is desired.

I claim:

1. A method for controlling quick setting of a pourable raw mixture, said raw mixture comprising a system of calcium hydroxide and aluminate reactive with calcium hydroxide together with a first retarding additive comprising reactive calcium sulfate; water; a second retarding additive comprising an organic setting retarder for aluminate, said organic setting retarder being capable of forming a complex and inhibiting the growth of calcium aluminate sulfate hydrates and at least one additional component selected from the group consisting of fillers, cements, pigments and plasticizers, said method comprising the steps of:

preparing a premixture of said aluminate with said organic setting retarder and said reactive calcium sulfate in a calcium hydroxide free aqueous environment so that the aluminate particles are coated to prevent reaction with the calcium hydroxide through a coating of gelatinous ettringite stabilized by said organic setting retarder;

adding at least essentially as much calcium hydroxide as is necessary for converting the reactive aluminate to low sulfate monophase of the mixed crystal series:

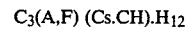

$$C_3(A,F)\,(Cs.CH).H_{12} \tag{3}$$

and mixing the premixture with the remaining components comprising the pourable raw mixture so that the solidification of the raw mixture results in the formation of monophases, and controlling the initiation time of the solidification and hydration characteristics by the choice of the ratio of the retarding additives comprising said organic setting retarder and said reactive calcium sulfate, and the mixture temperature.

2. The method of claim 1 wherein the raw mixture is chosen in such a manner that its holding time is between 15 minutes to 1.5 hours.

3. The method of claim 2 wherein the holding time is between 30 minutes and one hour.

4. The method of claim 2 wherein the raw mixture is heated to a temperature of more than approximately 45° C. within a short time period during the holding time.

5. The method of claim 4 wherein the raw mixture is heated approximately one to two minutes and with a sharp temperature increase.

6. The method of claim 1 wherein said calcium sulfate is calcium sulfate hemihydrate.

7. The method of claim 6 wherein said calcium sulfate hemihydrate is plaster of Paris.

8. The method of claim 1 wherein the step of preparing a premixture of aluminate with said organic setting retarder and said reactive calcium sulfate further includes said reactive calcium sulfate comprising calcium sulfate hemihydrate and calcium sulfate anhydrite whereby said pourable raw mixture is suitable for manufacturing autoclaveable products.

9. The method of claim 8 wherein the ratio between calcium sulfate hemihydrate and calcium sulfate anhydrite is 1:2 to 1:3.

10. The method of claim 1 wherein said aluminate is added as alumina cement to said raw mixture.

11. The method of claim 10 wherein calcium sulfate is used in an amount of 5 to 25% by weight of the total amount of alumina cement, organic setting retarder and calcium sulfate.

12. The method of claim 1 wherein the organic setting retarder is an hydroxycarboxylic acid.

13. The method of claim 12 wherein said hydroxycarboxylic acid is citric, tartaric, malic acid or a mixture thereof.

14. The method of claim 13 wherein the hydroxycarboxylic acid is used in a total amount of approximately 1 to 3% by weight of the amount of alumina cement, organic setting retarder and calcium sulfate.

15. The method of claim 1 wherein a portion of said calcium sulfate is replaced by a potassium compound.

16. The method of claim 1 wherein the raw mixture contains foam.

17. The method of claim 16 wherein part of the calcium sulfate of the raw mixture is replaced by potassium sulfate.

18. The method of claim 15 wherein in the case of a foamless raw mixture the potassium compound is potassium carbonate.

19. The method of claim 1 wherein the raw mixture comprises Portland cement, blast furnace cement or a mixture thereof.

20. The method of claim 1 wherein the raw mixture is used in producing:
a calcium silicate product, a cement bonded product, a ceramic or refractory product or a raw mixture for construction materials on the basis of organic binders.

21. The method of claim 1 wherein the raw mixture is used to produce mortar, plaster, or floor pavement.

22. The method of claim 20 wherein the calcium hydroxide is prepared by mixing quick lime and a corresponding amount of slaking water.

23. The method of claim 21 wherein the calcium hydroxide is prepared by mixing quick lime and a corresponding amount of slaking water.

24. A method for controlling quick setting of a pourable raw mixture, said raw mixture comprising a system of calcium hydroxide and alumina cement together with a first retarding additive comprising reactive calcium sulfate; water; a second retarding additive comprising a hydroxycarboxylic acid retarder capable of forming a complex and inhibiting the growth of calcium aluminate sulfate hydrates; foam, said method comprising the steps of:
preparing a premixture of said alumina cement with said hydroxycarboxylic acid retarder and said reactive calcium sulfate in a calcium hydroxide-free aqueous environment so that particles of reactive aluminate of said alumina cement are coated to prevent reaction with calcium hydroxide through a coating of gelatinous ettringite stabilized by said retarder;
adding at least essentially as much calcium hydroxide as is necessary for converting the reactive aluminate of said alumina cement to low sulfate monophase of the mixed crystal series:

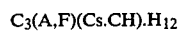

$$C_3(A,F)(Cs.CH).H_{12} \tag{3}$$

and mixing the premixture with the remaining components comprising the pourable raw mixture so that the solidification of the raw mixture results in the formation of monophases, and
controlling the initiation time of the solidification and hydration characteristics by the choice of the ratio of the retarding additives comprising said hydroxycarboxylic acid and said reactive calcium sulfate, and the mixture temperature.

25. The method of claim 24 wherein the raw mixture comprises Portland cement, blast furnace cement or a mixture thereof.

26. The method of claim 22 wherein the raw mixture is used in producing:
a calcium silicate product, a cement bonded product, a ceramic or refractory product or a raw mixture for construction materials on the basis of organic binders.

27. The method of claim 24 wherein the raw mixture is used to produce mortar, plaster, or floor pavement.

28. The method of claim 26 wherein the calcium hydroxide is prepared by mixing quick lime and a corresponding amount of slaking water.

29. The method of claim 27 wherein the calcium hydroxide is prepared by mixing quick lime and a corresponding amount of slaking water.

30. The method of claim 24 wherein calcium hydroxide is added to reactive aluminate in a ratio of at least about 1:2.

* * * * *